(12) United States Patent
Lin et al.

(10) Patent No.: US 11,616,447 B2
(45) Date of Patent: Mar. 28, 2023

(54) FLYBACK POWER CONVERTER AND RELEVANT CONTROL METHODS

(71) Applicant: Leadtrend Technology Corporation, Zhubei (TW)

(72) Inventors: Chung-Wei Lin, Zhubei (TW); Heng-Ci Lin, Zhubei (TW); Da-Jin Chen, Zhubei (TW); Yao-Wei Hsieh, Zhubei (TW)

(73) Assignee: LEADTREND TECHNOLOGY CORPORATION, Zhubei (TW)

( * ) Notice: Subject to any disclaimer, the term of this patent is extended or adjusted under 35 U.S.C. 154(b) by 52 days.

(21) Appl. No.: 17/510,646

(22) Filed: Oct. 26, 2021

(65) Prior Publication Data
US 2022/0200460 A1 Jun. 23, 2022

(30) Foreign Application Priority Data
Dec. 17, 2020 (TW) ................... 109144592

(51) Int. Cl.
*H02M 3/335* (2006.01)
(52) U.S. Cl.
CPC .... *H02M 3/33515* (2013.01); *H02M 3/33507* (2013.01); *H02M 3/33592* (2013.01)

(58) Field of Classification Search
CPC ......... H02M 3/33507; H02M 3/33515; H02M 3/33523; H02M 3/33561; H02M 3/33569; H02M 3/33576; H02M 3/33592
See application file for complete search history.

(56) References Cited

U.S. PATENT DOCUMENTS

| | | | | |
|---|---|---|---|---|
| 9,257,911 | B2* | 2/2016 | Sakurai | H02M 3/33507 |
| 9,479,067 | B2* | 10/2016 | Gong | H02M 3/33515 |
| 9,673,720 | B2* | 6/2017 | Lin | H02M 3/33592 |
| 10,128,763 | B2* | 11/2018 | Balakrishnan | H02M 3/33592 |
| 10,461,644 | B1* | 10/2019 | Gong | H02M 3/1582 |
| 2016/0359421 | A1* | 12/2016 | Lin | H02M 1/08 |
| 2018/0301999 | A1* | 10/2018 | Moon | H02M 3/33592 |

* cited by examiner

*Primary Examiner* — Gary A Nash
(74) *Attorney, Agent, or Firm* — McClure, Qualey & Rodack, LLP

(57) ABSTRACT

A flyback power converter converts an input power on a primary side into an output power on a secondary side. On the secondary side, the output power is monitored to provide a representative signal representing a characteristic of the output power. A count is kept unchanged when a clock ticks if the representative signal is within a first range defined in accordance with a target value, that the representative signal is going to be regulated at. The count is changed in response to the clock if the representative signal is within a second range different from the first range. In response to the count, a driving current is generated to control a coupler, which generates a compensation signal on the primary side that controls power transmitted from the primary side to the secondary side.

12 Claims, 6 Drawing Sheets

FLYBACK POWER CONVERTER AND RELEVANT CONTROL METHODS

CROSS-REFERENCE TO RELATED APPLICATION

This application claims priority to and the benefit of Taiwan Application Series Number 109144592 filed on Dec. 17, 2020, which is hereby incorporated by reference in its entirety.

BACKGROUND

The present disclosure relates generally to feedback control of a flyback power converter, and more particularly to feedback control that a secondary-side controller of a flyback power converter employs for the regulation of an output power.

A flyback power converter varies inductor current that goes through a primary winding of a transformer, so a secondary winding of the transformer inductively provides an induced current, which builds up an output power after rectification. A flyback power converter provides Galvanic isolation between primary and secondary sides, so that stray currents therebetween, such as difference in ground potential or currents induced by AC power, are blocked.

To control the current or voltage of an output power, a secondary-side controller is required to monitor the current or voltage, and feeds signals to a closed loop control system that modulates the power transmitted from the primary side to the secondary side. The loop gain of the closed loop control system is crucial though, and need be designed with caution, in order to achieve high stability of the output power. For example, phase margin or gain margin of the loop gain must be enough, or some zeros or poles must be introduced into the loop gain.

External components, such as resistors or capacitors, can be used to create zeros or poles in the loop gain when a secondary-side controller is in form of an integrated circuit chip on the secondary side, at the expense of higher manufacture cost due to the management and storage of those external components. Furthermore, the secondary-side controller might need additional pins to connect to the external components, implying a higher pin count and a higher chip cost.

Another approach to stabilize the closed loop control system is to build in the secondary-side controller an imbedded proportional-integral-derivative controller, programmable to process digital data based on output voltage or output current and to introduce desired zeros or poles in the loop gain. Nevertheless, this approach is hardly practical in view of cost, because it requires high-resolution analog-to-digital converters and huge amount of floating-point computation, all demanding considerable silicon wafer area to implement.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

A flyback power converter according to embodiments of the invention converts an input power on a primary side into an output power on a secondary side. The flyback power converter has a secondary-side controller to monitor the output power and to accordingly provide a representative signal representing the output voltage or the output current of the output power. The flyback power converter supposedly regulates the output power by stabilizing the representative signal at a target value. If the secondary-side controller finds the representative signal falls within a first range that covers the target value, it keeps a count of a counter unchanged, not varying when a clock ticks. If the representative signal is determined to fall within a second range outside the first range, the counter varies the count in response to the clock. A digital-to-analog converter converts the count into a driving current to control a coupler, which generates on the primary side a compensation signal. A pulse-width-modulation (PWM) controller on the primary side, in response to the compensation signal, controls the power transmitted from the primary side to the secondary side, to regulate the representative signal at the target value.

The flyback power converter employs a counter, a digital device, on the secondary side to provide feedback control, influencing the compensation signal on the primary side. The flyback power converter, if appropriately designed, could beneficially embodies a closed loop control system capable of stabilizing the output power without numerous external components or expensive floating-point computation. However, the invention is not limited to. Some embodiments of the invention could have external components or execute floating-point computation, to have a better closed loop control.

Figure 1:
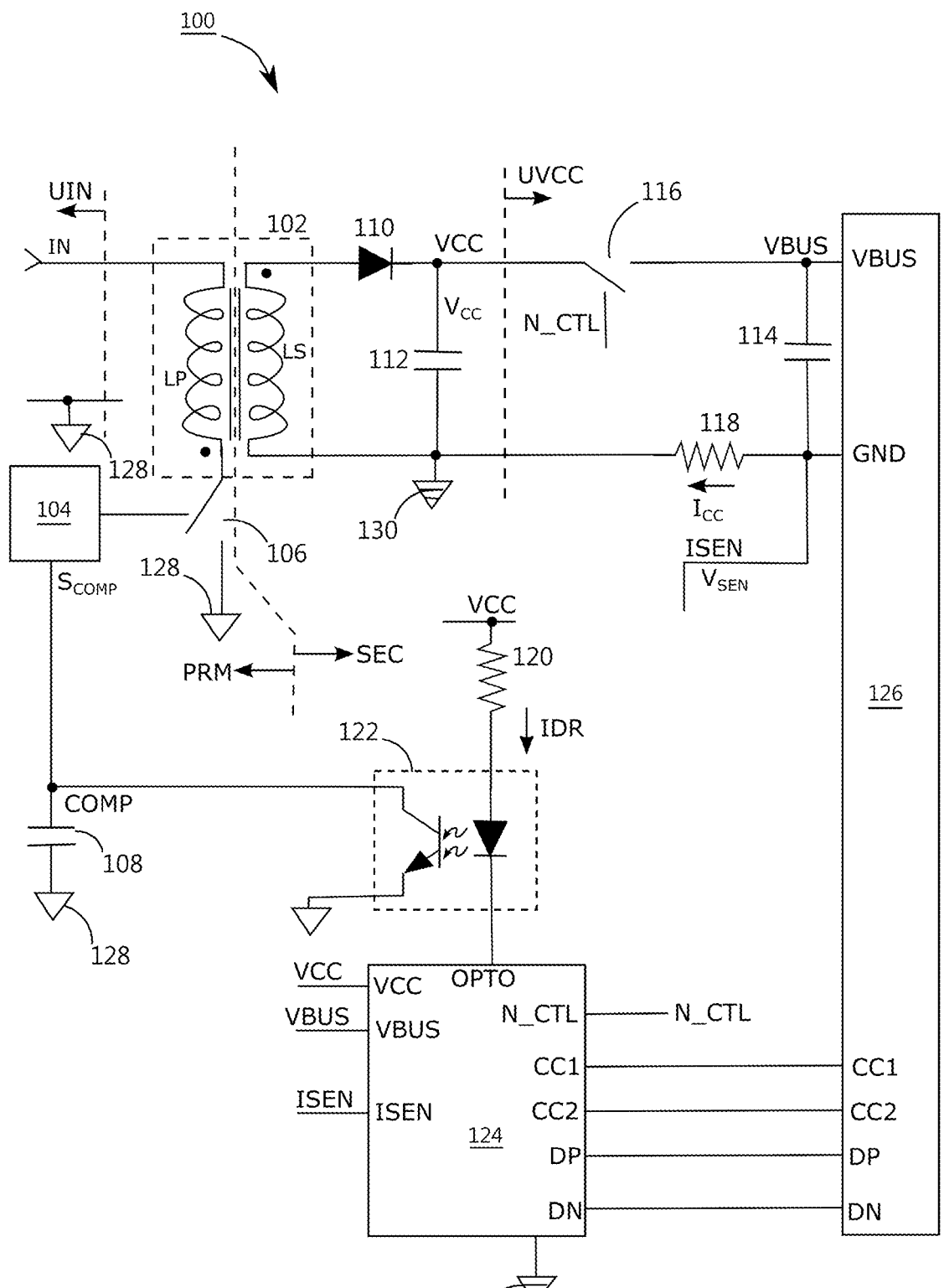
FIG. 1 illustrates flyback power converter 100 according to embodiments of the invention.

FIG. 1 illustrates flyback power converter 100, for converting input power UIN on primary side PRM into output power UVCC on secondary side SEC. Power line IN and input ground 128 electrically connect flyback power converter 100 to input power UIN, while output power UVCC with its output voltage $V_{CC}$ and output current $I_{CC}$ supplies power to a load, which for example is an electronic apparatus connected to USB port 126.

Flyback power converter has transformer 102, PWM generator 104, power switch 106, compensation capacitor 108, rectifier diode 110, output capacitors 112 and 114, output switch 116, current-sense resistor 118, current-limiting resistor 120, photo coupler 122, and secondary-side controller 124.

On primary side PRM, primary winding LP of transformer 102 is connected in series with power switch 106 between power line IN and input ground 128. PWM generator 104 turns ON and OFF power switch 106 to alter the winding current through primary winding LP.

The variation of the voltage and the current of primary winding LP creates induced voltage and induced current of secondary winding LS on secondary side SEC. Diode 110 rectifies the induced voltage and current of secondary winding LS to build output power UVCC. When output power UVCC is seemingly ready, secondary-side controller 124 sends signals at control node N_CTL to turn ON output switch 116, so output power UVCC starts supplying power to USB port 126.

According to one embodiment of the invention, secondary-side controller 124 is in form of an integrated circuit chip, monitoring from power pin VCC output voltage $V_{CC}$ of output power UVCC and from pin ISEN output current $I_{CC}$ of output power UVCC. The voltage at pin ISEN represents output current $I_{CC}$, which flows through current-sense resistor 118. Output voltage $V_{CC}$ and output current $I_{CC}$ are two characteristics of output power UVCC. Secondary-side controller 124 compares output voltage $V_{CC}$ with target voltage $V_{TAR}$ (not shown in FIG. 1), and in response to the difference between them controls driving current IDR going through photo coupler 122 and current-limiting resistor 120. Photo coupler 122 couples a signal from secondary side SEC to primary side PRM, and generates at compensation node COMP compensation signal $S_{COMP}$, based on which PWM generator 104 modulates the duty cycle of power switch 106, so as to control the power transmitted from primary side PRM to secondary side SEC. For example, if output voltage $V_{CC}$ is below target voltage $V_{TAR}$, 12V for example, secondary-side controller 124 accordingly reduces driving current IDR through photo coupler 122, so compensation signal $S_{COMP}$ raises, the duty cycle of power switch 106 grows, and power transmitted from primary side PRM to secondary side SEC increases to boost up output voltage $V_{CC}$. Accordingly, a closed loop control system with negative feedback is built, regulating output voltage $V_{CC}$ at target voltage $V_{TAR}$. Analogously, secondary-side controller 124 also joins to construct another closed loop control system to limit output current $I_{CC}$ under target current $I_{TAR}$ (not shown in FIG. 1).

Figure 2:
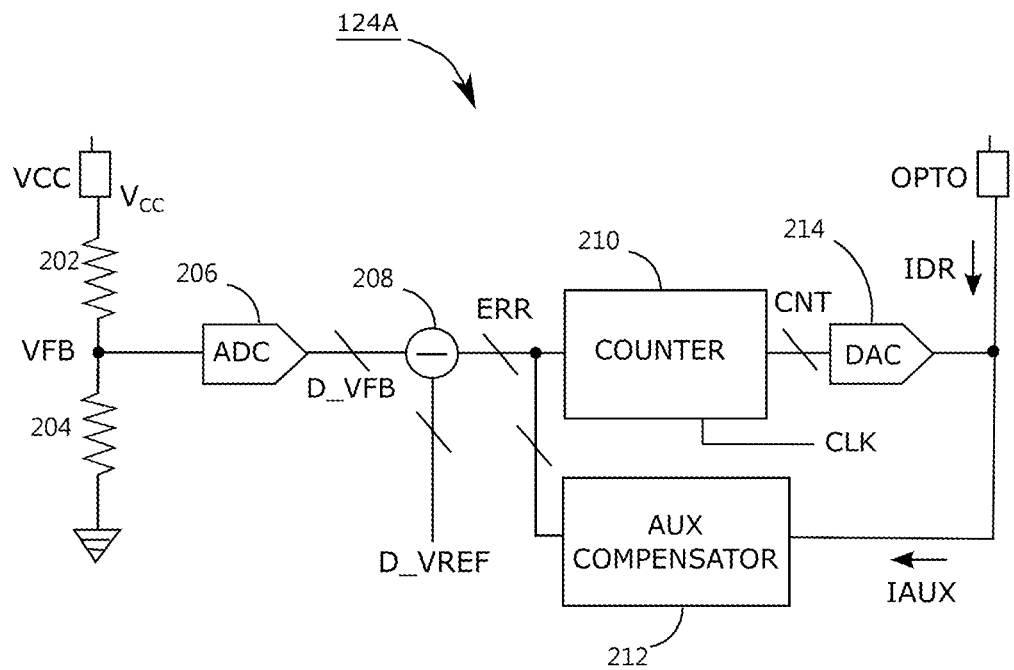
FIG. 2 demonstrates secondary-side controller 124A suitable for use in FIG. 1, according to embodiments of the invention.

FIG. 2 demonstrates secondary-side controller 124A suitable for use in FIG. 1. Secondary-side controller 124A includes voltage-dividing resistors 202, 204, analog-to-digital converter (ADC) 206, subtractor 208, counter 210, auxiliary compensator 212, and digital-to-analog converter (DAC) 214.

Voltage-dividing resistors 202 and 204 are connected in series between power line VCC and output ground 130. The combination of voltage-dividing resistors 202 and 204 monitors output voltage $V_{CC}$ to generate at the joint between voltage-dividing resistors 202 and 204 feedback voltage VFB, a representative signal of output voltage $V_{CC}$ because it is substantially in proportion to output voltage $V_{CC}$.

ADC 206 converts feedback voltage VFB into digital signal D_VFB, a digital version of feedback voltage VFB.

Subtractor 208, as a comparator, compares digital signal D_VFB with digital reference signal D_VREF, which is a digital version of reference voltage VREF, 2.5V for example, and may be provided and determined by a microprocess embedded in secondary-side controller 124A. Reference voltage VREF is the target value at which feedback voltage VFB is going to be regulated. Just like feedback voltage VFB corresponds to output voltage $V_{CC}$, reference voltage VREF corresponds to target voltage $V_{TAR}$ that output voltage $V_{CC}$ is about to be regulated at. Subtractor 208 subtracts digital reference signal D_VREF from digital signal D_VFB to output error ERR, a digital version of the difference between feedback voltage VFB and reference voltage VREF.

Figure 3:
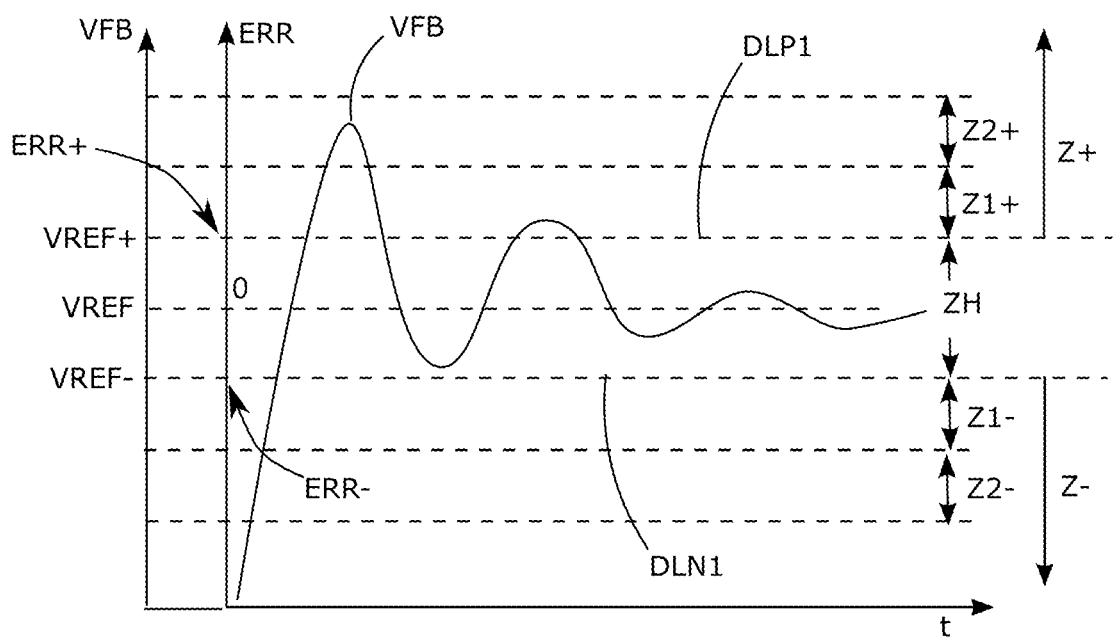
FIG. 3 shows a waveform of feedback voltage VFB, where the horizontal axis is time and the vertical axis is feedback voltage VFB or error ERR.

FIG. 3 shows a waveform of feedback voltage VFB, where the horizontal axis is time and the vertical axis is feedback voltage VFB or error ERR. As error ERR differs from feedback voltage VFB by reference voltage VREF, the vertical axis clearly indicates that error ERR is 0 when feedback voltage VFB is at reference voltage VREF. FIG. 3 shows at its right side several ranges ZH, Z1+, Z2+, Z1−, Z2−, Z+ and Z−. As shown in FIG. 3, range ZH, which is between dashed lines DLP1 and DLN1, ranges from predetermined voltage VREF− to predetermined voltage VREF+ in view of feedback voltage VFB, or from error value ERR− to error value ERR+ in view of error ERR, where reference voltage VREF is within range ZH. In one embodiment of the invention, reference voltage VREF is the average of predetermined voltages VREF− and VREF+. On top of range ZH are ranges Z1+, Z2+, and so on, where these ranges do not overlap one another. Underneath range ZH are ranges Z1−, Z2−, and so on, where these ranges do not overlap one another. FIG. 3 also illustrates range Z+, which covers all the space above dashed line DLP1, and makes ranges Z1+ and Z2+ its subsets. In other words, range Z+ includes ranges Z1+ and Z2+. Analogously, range Z− covers all the space under dashed line DLN1, and includes ranges Z1− and Z2−. For example, feedback voltage VFB is determined to be within range ZH, if the value of feedback voltage VFB is between predetermined voltages VREF− and VREF+, or error ERR between error values ERR− and ERR+. Ranges ZH, Z1+, Z2+, Z1−, Z2−, Z+ and Z− are all defined in accordance with reference voltage VREF. In case that reference voltage VREF changes from 2.5V into 1V for instance, all the ranges change accordingly.

In perspective, range ZH implies a condition that feedback voltage VFB is about on target, or very close to reference voltage VREF. Ranges Z1+ and Z1−, as being just next to range ZH, are conditions indicating that feedback voltage VFB is very close to range ZH even though it is not on target. Ranges Z2+ and Z2−, next to ranges Z1+ and Z1− respectively, are worse conditions indicating that feedback voltage VFB has adversely gone further away from reference voltage VREF. Ranges Z+ and Z− mean the condition that feedback voltage VFB is not on target.

Please refer to both FIGS. 2 and 3. Counter 210 generates count CNT in response to clock CLK and error ERR. In some embodiments, clock CLK is provided from an imbedded microprocessor in secondary-side controller 124A. Counter 210 could increase, decrease, or maintain count CNT as clock CLK ticks. Counter 210 keeps count CNT unchanged when clock CLK ticks, if error ERR in FIG. 2 indicates that feedback voltage VFB is currently within range ZH, the range that covers reference voltage VREF. Clock CLK triggers counter 210 to increase count CNT by a predetermined change, 1 for example, if feedback voltage VFB is currently determined to be within range Z+. Clock CLK triggers counter 210 to decrease count CNT by a predetermined change, 1 for example, if feedback voltage VFB is currently within range Z−.

As shown in FIG. 2, DAC 214 converters count CNT into driving current IDR, which drives via pin OPTO photo coupler 122 of FIG. 1.

Based on error ERR, auxiliary compensator 212 in FIG. 2 provides auxiliary current IAUX to alter driving current IDR. In one embodiment of the invention, auxiliary current IAUX is not zero only when feedback voltage VFB is found to drift too far away from reference voltage VREF. For example, auxiliary current IAUX is OA if error ERR indicates that feedback voltage VFB falls in range ZH, Z1+ or Z1−, the ranges in which feedback voltage VFB is on target or around target. Auxiliary current IAUX is a positive constant if feedback voltage VFB falls in range Z2+, and a negative constant if feedback voltage VFB falls in range Z2−, therefore driving current IDR quickly changed to increase the loop gain.

The invention is not limited to the ranges shown in FIG. 3, and embodiments of the invention might have more ranges to implement more complicate control. In one embodiment of the invention, there are ranges Z3+ and Z3−, not shown in FIG. 3. Range Z3+ resides on top of range Z2+, and range Z3− under range Z2−. If feedback voltage VFB is determined to be within range Z3+, auxiliary current IAUX is another positive constant, larger than the positive constant the auxiliary current IAUX is when feedback voltage VFB is within range Z2+. Similarly, if feedback voltage VFB is determined to be within range Z3−, auxiliary current IAUX is another negative constant, less than the negative constant that auxiliary current IAUX is when feedback voltage VFB is within range Z2−.

Figure 4:
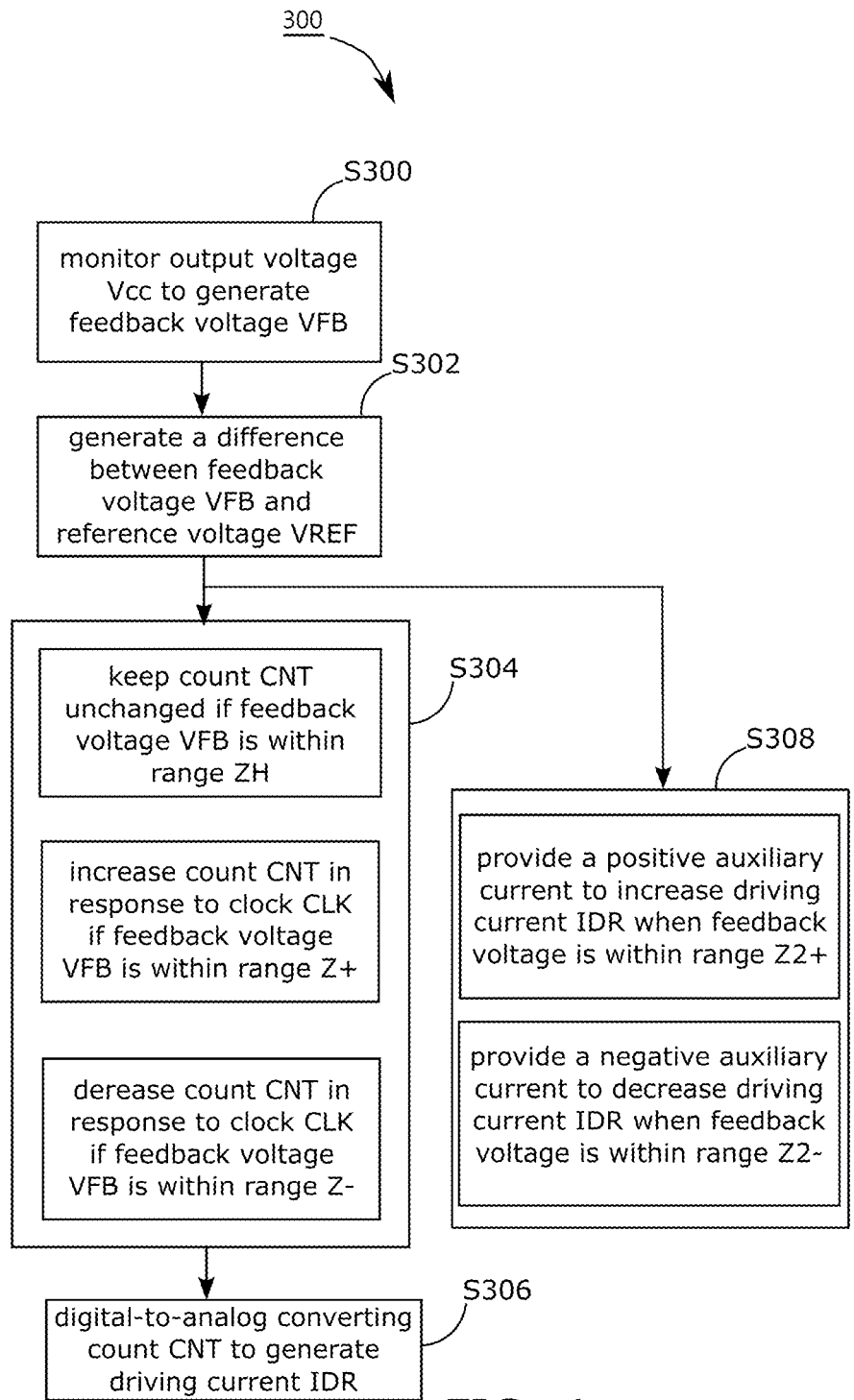
FIG. 4 demonstrates control method 300 in use of secondary-side controller 124A.

FIG. 4 demonstrates control method 300 in use of secondary-side controller 124A, including steps S300, S302, S304, S306 and S308. Step S300 is performed by voltage-dividing resistors 202 and 204, step S302 by the combination of ADC 206 and subtractor 208, step S304 by counter 210, step S306 by DAC 214, and step S308 by auxiliary compensator 212. FIG. 4 is self-explanatory in view of the teachings related to FIGS. 1, 2 and 3.

Figure 5:
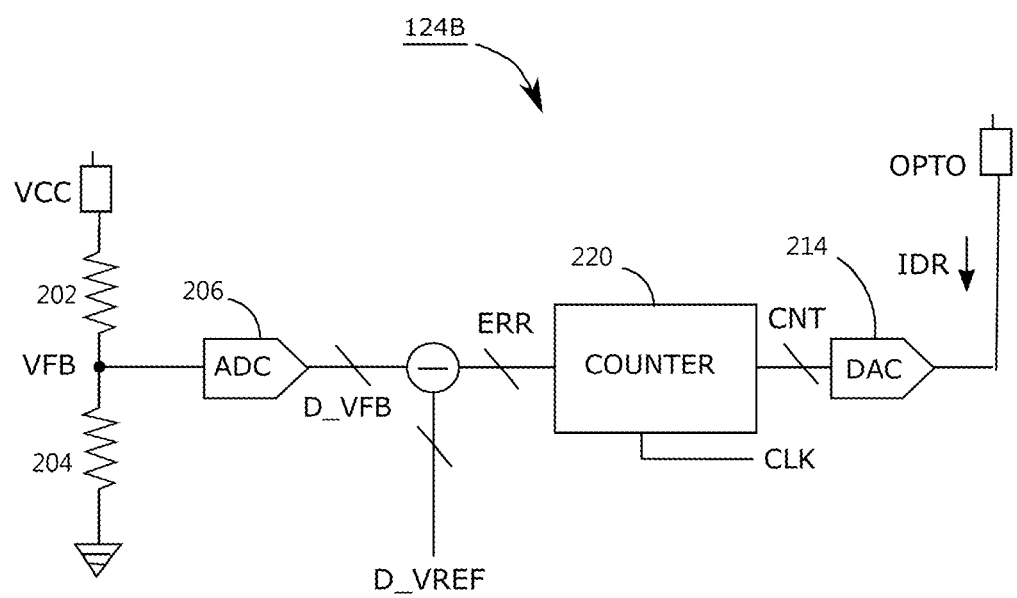
FIG. 5 demonstrates secondary-side controller 124B suitable for use in FIG. 1, according to embodiments of the invention.

FIG. 5 demonstrates secondary-side controller 124B suitable for use in FIG. 1. Secondary-side controller 124B includes voltage-dividing resistors 202, 204, ADC 206, subtractor 208, counter 220, and DAC 214. The similar or the same components between secondary-side controllers 124A and 124B are not repeatedly detailed because they are comprehensible in view of the teachings of secondary-side controllers 124A. While secondary-side controller 124B has counter 220 different from counter 210 of secondary-side controller 124A, it further lacks auxiliary compensator 212 of secondary-side controller 124A.

Please refer to both FIGS. 5 and 3. Counter 220 generates count CNT in response to clock CLK and error ERR. In some embodiments, clock CLK is provided from an imbedded microprocessor in secondary-side controller 124B. Counter 220 increases, decreases, or maintains count CNT as clock CLK ticks. Counter 220 keeps count CNT unchanged if error ERR in FIG. 2 indicates that feedback voltage VFB is currently within range ZH, the range that covers reference voltage VREF. Clock CLK triggers counter 220 to increase count CNT by predetermined change dN, if feedback voltage VFB is currently determined to fall within range Z1+, where dN is a positive integer, 1 for example. Counter 220 increases count CNT by 2*dN, a bigger amount than dN, if feedback voltage VFB currently falls within range Z2+. Analogously, clock CLK triggers counter 220 to decrease count CNT by predetermined change dN, if feedback voltage VFB is currently determined to fall within range Z1−. Counter 210 decreases count CNT by 2*dN if feedback voltage VFB currently falls within range Z2−.

The invention is not limited to the ranges shown in FIG. 3, and embodiments of the invention might have more ranges to implement more complicate control. In one embodiment of the invention, there are ranges Z3+ and Z3−, not shown in FIG. 3. Range Z3+ resides right above range Z2+, and range Z3− under range Z2−. If feedback voltage VFB falls within range Z3+, clock CLK triggers counter 220 to increase count CNT by 4*dN, for example. If feedback voltage VFB falls within range Z3−, counter 220 decreases count CNT by 4*dN.

Simply speaking, the change to count CNT that clock CLK triggers counter 220 to do becomes more if error ERR indicates that feedback voltage VFB is further away from reference voltage VREF. The more change to count CNT per clock, the speedier change to driving current IDR, the higher loop gain.

Figure 6:
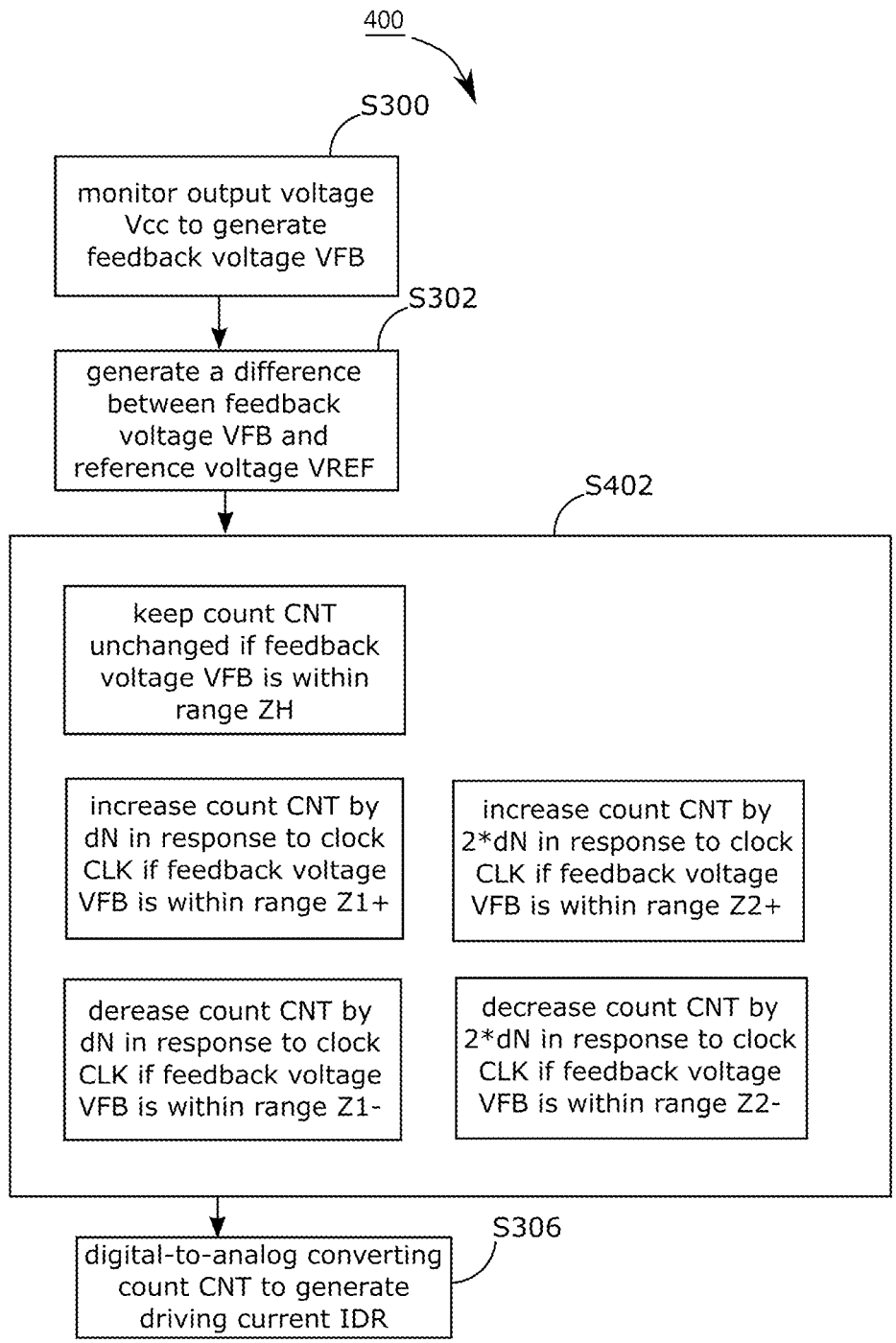
FIG. 6 shows control method 400 in use of secondary-side controller 124B.

FIG. 6 shows control method 400 in use of secondary-side controller 124B, including steps S300, S302, S402, and S306. Step S300 is performed by voltage-dividing resistors 202 and 204, step S302 by the combination of ADC 206 and subtractor 208, step S402 by counter 220, and step S306 by DAC 214. FIG. 6 is self-explanatory in view of the teachings related to FIGS. 1, 3 and 5.

Secondary-side controllers 124A and 124B are two examples used to regulate output voltage $V_{CC}$, a characteristic of output power UVCC, but the invention is not limited to. Embodiments of the invention could regulate other characteristics of the output power UVCC, such as output current $I_{CC}$.

Figure 7:
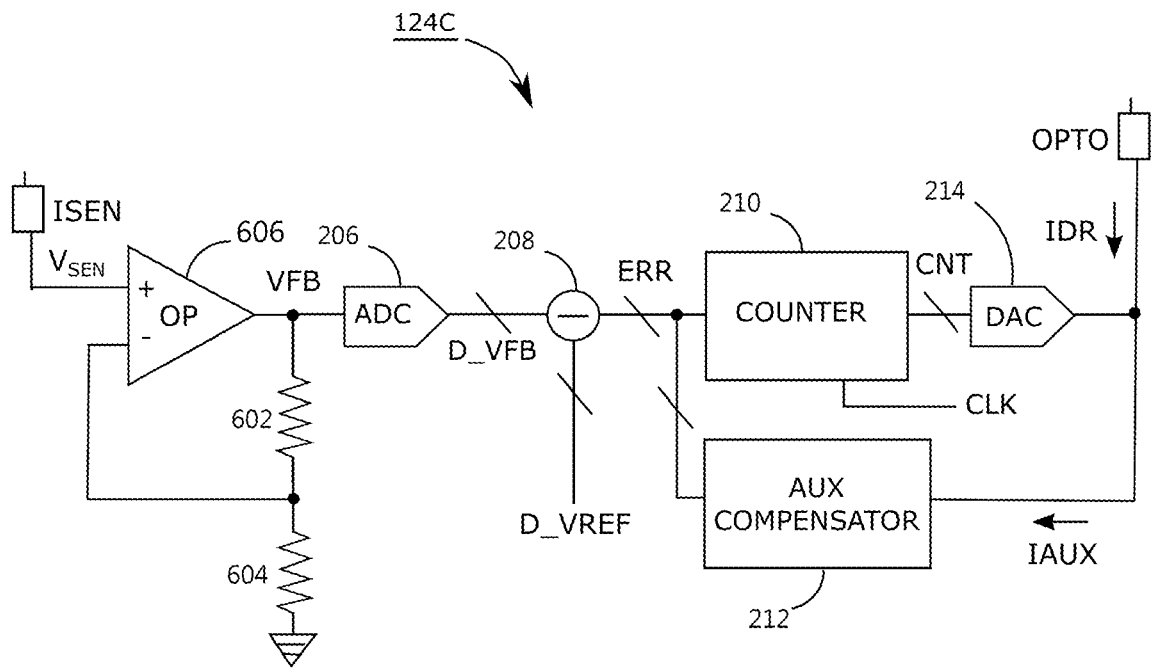
FIGS. 7 and 8 show secondary-side controller 124C and 124D, both suitable in use of FIG. 1, to regulate output current $I_{CC}$ according to embodiments of the invention.
Figure 8:
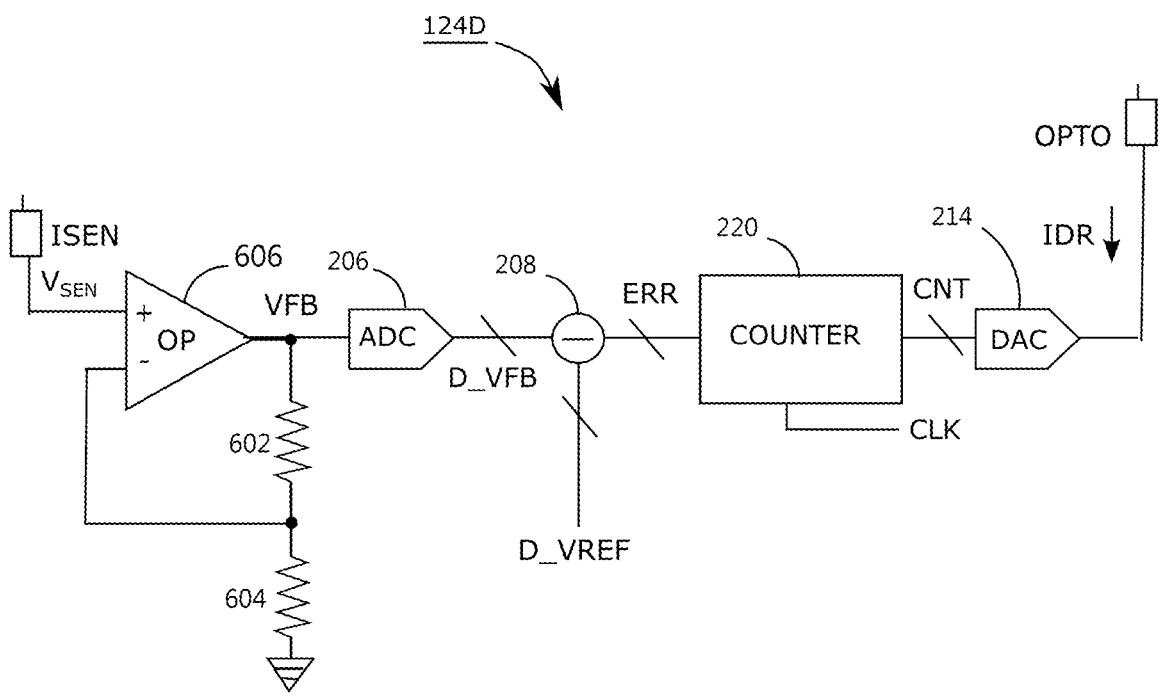

FIGS. 7 and 8 show secondary-side controller 124C and 124D, both suitable in use of FIG. 1, to regulate output current $I_{CC}$. FIGS. 7 and 8 are similar with FIGS. 2 and 5 respectively, and the similar or the same components therebetween are not repeatedly detailed because they are comprehensible in view of the teachings regarding to FIGS. 2 and 5.

Sense voltage $V_{SEN}$ at pin ISEN in FIG. 1 can represent output current $I_{CC}$. In FIGS. 7 and 8, sense voltage $V_{SEN}$ is amplified by an amplifier constructed by operational amplifier (OP) 606, and resistors 602 and 604, so the output of OP 606 supplies feedback voltage VFB. Feedback voltage VFB therefore represents sense voltage $V_{SEN}$ and output current $I_{CC}$. When secondary-side controller 124 is replaced by secondary-side controller 124C or 124D, output current $I_{CC}$ could be regulated at a predetermined current value corresponding to reference voltage VREF.

While the invention has been described by way of examples and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A flyback power converter for converting an input power on a primary side into an output power on a secondary side, comprising:
   a coupler electrically connected to both the primary and secondary sides, for generating a compensation signal on the primary side that controls power transmitted from the primary side to the secondary side; and
   a secondary-side controller on the secondary side, configured to perform steps comprising:

monitoring the output power to provide a representative signal representing a characteristic of the output power;
keeping a count unchanged if the representative signal is within a first range covering a target value;
changing the count in response to a clock if the representative signal is within a second range different from the first range; and
generating a driving current to control the coupler in response to the count;
wherein the flyback power converter is configured to regulate the representative signal at the target value.

2. The flyback power converter as claimed in claim 1, wherein the secondary-side controller comprises:
a first analog-to-digital converter converting the representative into a first digital signal;
a subtractor subtracting a digital reference signal from the first digital signal, to generate an error;
a counter providing the count in response to the error and the clock; and
a first digital-to-analog converter converting the count into the driving current.

3. The flyback power converter as claimed in claim 1, wherein the secondary-side controller is configured to perform following steps, comprising:
changing the count by a first amount in response to the clock if the representative signal is within a third range covered by the second range; and
changing the count by a second amount in response to the clock if the representative signal is within a fourth range covered by the second range;
wherein the third range is between the fourth range and the first range; and
the absolute value of the second amount is larger than the absolute value of the first amount.

4. The flyback power converter as claimed in claim 1, wherein the second range includes a third range and a fourth range, the third range is between the fourth range and the first range, and the secondary-side controller comprises an auxiliary compensator providing an auxiliary current to change the driving current when the representative signal is within the fourth range.

5. The flyback power converter as claimed in claim 4, wherein the auxiliary current is zero if the representative signal is within the first or third range.

6. The flyback power converter as claimed in claim 1, wherein the coupler is a photo coupler.

7. The flyback power converter as claimed in claim 1, comprising two resistors dividing an output voltage of the output power to provide the representative signal.

8. The flyback power converter as claimed in claim 1, further comprising:

a PWM generator on the primary side, modulating a duty cycle of the power switch in response to the compensation signal.

9. A control method in use of a flyback power converter converting an input power on a primary side into an output power on a secondary side, the control method comprising:
monitoring the output power to provide a representative signal representing a characteristic of the output power;
keeping a count unchanged when a clock ticks if the representative signal is within a first range covering a target value;
changing the count in response to the clock if the representative signal is within a second range different from the first range; and
generating a driving current to control a coupler in response to the count;
wherein the coupler is electrically connected to both the primary and secondary sides, for, in response to the driving current, generating a compensation signal on the primary side that controls power transmitted from the primary side to the secondary side.

10. The control method as claimed in claim 9, further comprising:
converting the representative signal into a first digital signal;
subtracting a digital reference signal from the first digital signal, to generate an error;
providing the count in response to the error and the clock; and
converting the count into the driving current;
wherein the digital reference signal corresponds to the target value.

11. The control method as claimed in claim 9, comprising:
changing the count by a first amount in response to the clock if the representative signal is within a third range covered by the second range; and
changing the count by a second amount in response to the clock if the representative signal is within a fourth range covered by the second range;
wherein the third range is between the fourth range and the first range; and
the absolute value of the second amount is larger than the absolute value of the first amount.

12. The control method as claimed in claim 9, wherein the second range includes a third range and a fourth range, the third range is between the fourth range and the first range, and the control method comprises:
providing an auxiliary current to change the driving current when the representative signal is within the fourth range.

* * * * *